No. 715,031. Patented Dec. 2, 1902.
G. M. DAVIDSON.
WATER PURIFIER.
(Application filed Mar. 8, 1902.)
(No Model.)
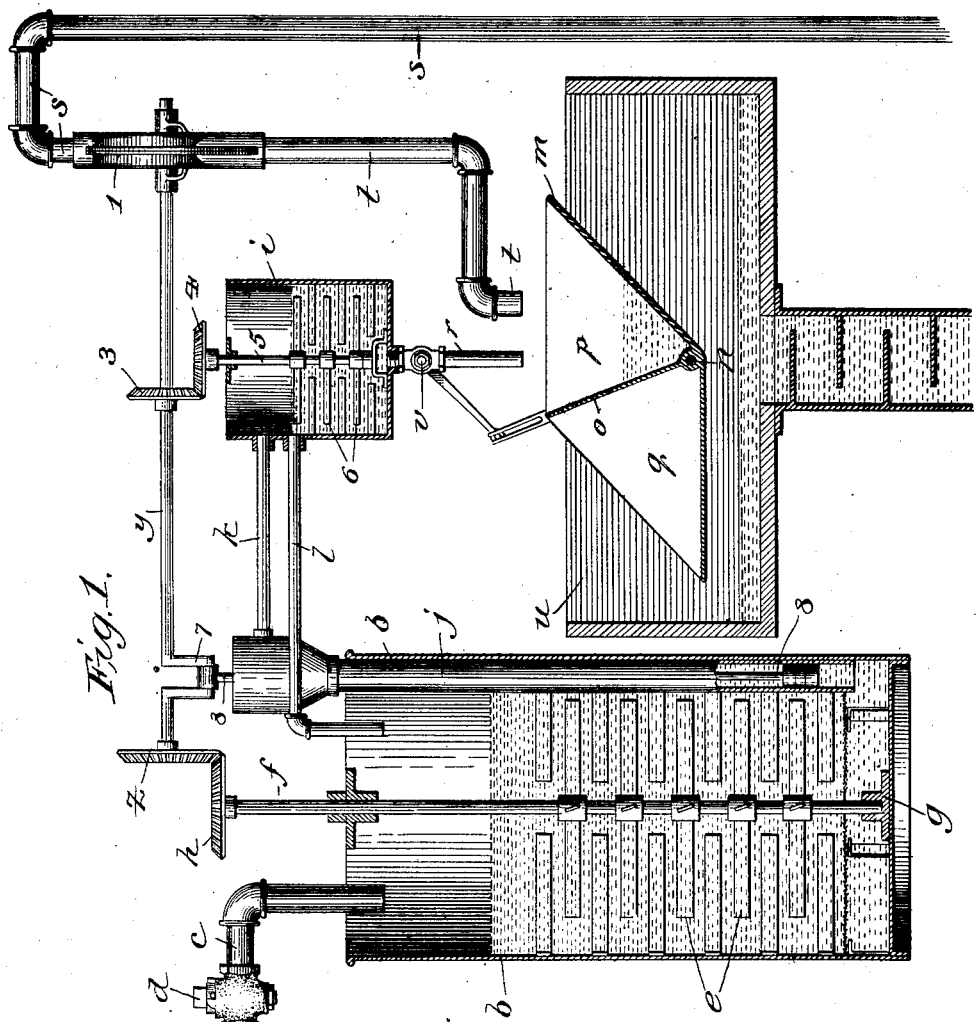
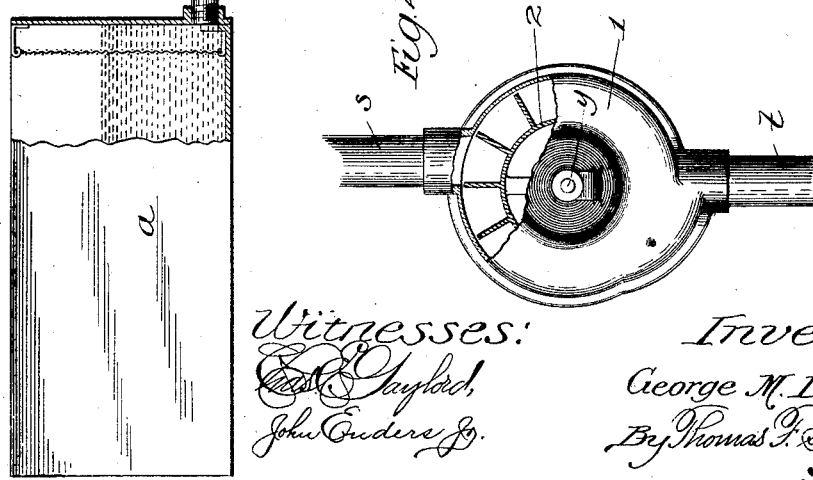
Witnesses:
Inventor:
George M. Davidson,
By Thomas F. Sheridan,
Atty.

UNITED STATES PATENT OFFICE.

GEORGE M. DAVIDSON, OF OAKPARK, ILLINOIS.

WATER-PURIFIER.

SPECIFICATION forming part of Letters Patent No. 715,031, dated December 2, 1902.

Application filed March 8, 1902. Serial No. 97,360. (No model.)

*To all whom it may concern:*

Be it known that I, GEORGE M. DAVIDSON, a citizen of the United States, residing at Oakpark, in the county of Cook and State of Illinois, have invented certain new and useful Improvements in Water-Purifiers, of which the following is a specification.

This invention relates to that class of mechanisms known as "water-purifiers"—that is, an apparatus arranged to mix a predetermined proportion of chemicals with feed-water before the same is used in steam-boilers, all of which will more fully hereinafter appear.

The principal object of the invention is to provide a simple, economical, and efficient water-purifier.

A further object of the invention is to provide a water-purifier with mechanism for mixing predetermined quantities of water and chemicals together.

Further objects of the invention will appear from an examination of the drawings and the following description and claims.

The invention consists principally in the combination of a chemical-feed tank provided with a discharge-pipe, a tilting water and chemical mixing vessel arranged to receive a discharge from the chemical-feed tank, a water-supply pipe for furnishing water to the tilting vessel, and a valve in the chemical-discharge pipe arranged to be operated by and during the movements of the tilting vessel.

The invention consists, further and finally, in the features, combinations, and details of construction hereinafter described and claimed.

In the accompanying drawings, Figure 1 is a diagrammatic view of the arrangement of the elements and apparatus embodying my improvements, and Fig. 2 a side elevation of the motor for operating some of the mechanisms.

In the art to which this invention relates it is well known that most water contains more or less incrusting solid matter in solution or other deleterious elements, which if fed into steam-boilers is during the steam generation generally deposited in the form of scale on the inner surface thereof, all of which acts to incrust the flues and crown-sheet and lessen the efficiency of the boiler, resulting in an extra consumption of fuel and decreasing the life of the boiler. It is also well known that a great many chemicals may be used and mixed with the feed-water before it enters the boiler to counteract the effects of the said solids or other deleterious substances, so that the water when used will not have such a deteriorating influence on the boiler.

The principal object, therefore, of this invention is to provide a suitable mixing apparatus, an apparatus which measures the chemicals and water in predetermined quantities and mixes them thoroughly before they enter the settling tank or tanks preliminary to being fed into the boiler, all of which will be more fully hereinafter set forth.

In constructing an arrangement and apparatus in accordance with these improvements I provide a preliminary chemical-mixing vat $a$, into which the chemicals and a desired amount of water are first mixed and dissolved, so as to form the chemical mixture. In order to thoroughly mix this chemical solution after it has been primarily dissolved or mixed together, I provide a chemical-mixing tank $b$, which is arranged, preferably, in the shape of a vertical cylinder, open at the top, and into which a discharge-pipe $c$ from the chemical-vat empties. This discharge-pipe is provided with a "plug" or other suitable valve $d$, which may be opened and closed whenever desirable or necessary. To thoroughly mix and keep the chemical solution stirred and in condition for use, this chemical-mixing tank is provided with stirrers or beaters $e$, arranged upon a rotatable shaft $f$, vertically arranged in the longitudinal center of the tank. The lower part of this rotatable stirrer-shaft has a stepped bearing $g$ in the lower part of the tank, and the upper part is provided with a bevel-shaft $h$, arranged to be driven and operated as hereinafter set forth.

In order to measure and feed the chemical solution so that it may be mixed with the requisite quantity of water-supply and to maintain a proper head to insure the necessary feed at all times, a chemical-feed tank $i$ is provided and connected with the chemical-mixing tank by means of a pump $j$ and its discharge-spout $k$. When the chemical-pump $j$ is operated, the chemical solution is raised and discharged through the discharge-spout thereof and into the feed-tank. To maintain a constant head in such feed-tank, it is provided with an overflow-pipe $l$, which returns the overflow from the feed to the chemical-mixing tank.

For the purpose of feeding and mixing the desired or predetermined proportions of chemicals and water together a tilting water and chemical mixing vessel $m$ is provided, substantially diamond-shaped in side elevation and mounted upon a rock-shaft $n$ at one of the angles of the diamond, preferably the lower angle. This tilting vessel has a central partition $o$ arranged across the shortest diameter of the diamond, so as to form two triangular mixing-chambers $p$ and $q$. The chemical-feed tank is provided with a discharge pipe or spout $r$, and the main water-supply pipe $s$ is provided with a discharge-spout $t$, both arranged over the tilting vessel and the same chamber thereof. It will therefore be seen that when, say, the chamber $p$ is filled with liquid the tilting vessel rocks to the right until its outer wall approaches a horizontal plane, and such action dumps the mixed water and chemical into a settling-tank $u$, at the same time bringing the other chamber $q$ into the position beneath the spouts. When the chamber $q$ is filled, the tilting vessel rocks to the position shown in the drawings and empties the water of such chamber into the settling-tank. The water-supply being constant and measured by the respective chambers of the tilting vessel, it is desirable that a certain amount of chemicals be emptied or discharged thereinto, so as to provide for the desired purification of the water. In order, therefore, to provide for this amount, the discharge-pipe of the chemical-feed tank is preferably provided with a rotatable plug-valve $v$, having a lever-arm $w$, which extends out at an angle thereto and is arranged to be engaged by a slotted arm $x$ on the tilting vessel. In the position shown in the drawings this discharge-valve $v$ is closed; but it will be seen that when the tilting vessel is rocked to the right until the arm assumes a position of similar angle on the other side the valve will be opened and closed thereby and that during this opening and closing of the valve $v$ a certain predetermined amount of the chemicals will pass through the discharging-valve and into the mixing and measuring chamber. It will further be seen that the control—that is, the opening and closing—of this discharge-valve or the movements thereof are operated by and during the movements of the tilting vessel.

It is highly desirable to provide some simple means of actuating the pump and stirring mechanisms. To accomplish this, a water wheel or motor 1 is provided and arranged in the water-supply pipe, so that its rotatable head 2 can be operated by the flow of water therethrough. This water-motor head is mounted upon a shaft $y$ and has a bevel-gear $z$ engaging with the bevel-gear on the stirrer-shaft of the chemical-mixing tank, a second bevel-gear 3 engaging with a bevel-gear 4 on a stirrer-shaft 5 in the chemical-feed tank, which shaft carries a plurality of stirrers or blades 6 to keep the chemicals in such tank thoroughly mixed. The motor-shaft is also provided with a crank 7, engaging with the pump-rod 8 of the pump which is contained in the chemical-mixing vessel. From this arrangement and construction it will be seen that during the feed of water to the tilting vessel the motor is always operated, and only at such times, all of which will be thoroughly understood and appreciated by those skilled in the art.

I claim—

1. In a water-purifier of the class described, the combination of a chemical-mixing tank, a chemical-feed tank connected therewith and provided with a discharge-pipe, a movable water and chemical mixing vessel arranged to receive the discharge of the chemical-feed pipe, a water-supply pipe for furnishing water to the tilting vessel to operate the same, a valve in the chemical-discharge pipe arranged to be operated by the movements of the movable mixing vessel, stirring mechanism in the chemical mixing and feed tanks, and a motor arranged in the water-supply channel to operate the same, substantially as described.

2. In a water-purifier of the class described, the combination of a chemical-mixing tank, a chemical-feed tank, a pump connecting the chemical mixing and feed tanks together, stirring mechanism in the mixing-tank, stirring mechanism in the feed-tank, a discharge-pipe in the chemical-feed tank, a tilting water and chemical mixing vessel arranged to receive the discharge of the chemical-feed tank, a water-supply pipe for furnishing water to the tilting vessel to operate the same, a valve in the chemical-discharge pipe arranged to be operated by means of the tilting vessel, and a water-motor in the water-supply channel for operating the stirring mechanism and pump, substantially as described.

3. In a water-purifier of the class described, the combination of a chemical-mixing tank, stirring mechanism therein, a chemical-feed tank provided with a discharge-pipe and stirring mechanism, a pump connecting the chemical mixing and feed tanks together, an overflow-pipe leading from the chemical-feed tank to the mixing-tank, a tilting water and chemical mixing vessel arranged to receive the discharge of the chemical-feed tank, a water-supply pipe for furnishing water to the tilting vessel to operate the same, a valve in the chemical-discharge pipe arranged to be operated by the movements of the tilting vessel, and a water-motor in the water-supply pipe connected with so as to operate the stirring and pump mechanisms during the flow of water to the tilting vessel, substantially as described.

GEORGE M. DAVIDSON.

Witnesses:
 THOMAS F. SHERIDAN,
 ANNIE C. COURTENAY.